United States Patent
Hirata et al.

(10) Patent No.: US 7,542,233 B2
(45) Date of Patent: Jun. 2, 2009

(54) PERPENDICULAR MAGNETIC RECORDING ELEMENT, THIN FILM MAGNETIC HEAD, MAGNETIC HEAD DEVICE, AND MAGNETIC RECORDING/REPRODUCING APPARATUS FOR REDUCING DELETERIOUS EFFECTS OF EXTERNAL MAGNETIC FIELDS

(75) Inventors: Kei Hirata, Tokyo (JP); Takahiko Machita, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 390 days.

(21) Appl. No.: 11/337,659

(22) Filed: Jan. 24, 2006

(65) Prior Publication Data
US 2006/0203379 A1 Sep. 14, 2006

(30) Foreign Application Priority Data
Mar. 11, 2005 (JP) .............................. 2005-069242

(51) Int. Cl.
*G11B 5/17* (2006.01)
(52) U.S. Cl. .............................. 360/123.12; 360/125.16
(58) Field of Classification Search ............ 360/125.03, 360/123.37, 123.58, 123.11, 123.12, 125.16
See application file for complete search history.

(56) References Cited

U.S. PATENT DOCUMENTS

| 4,656,546 | A | * | 4/1987 | Mallory ...................... 360/110 |
| 4,935,832 | A | * | 6/1990 | Das et al. .................... 360/112 |
| 5,003,423 | A | * | 3/1991 | Imamura et al. ........ 360/125.03 |
| 5,075,956 | A | * | 12/1991 | Das .......................... 29/603.14 |
| 6,754,049 | B1 | | 6/2004 | Seagle et al. |
| 6,954,340 | B2 | * | 10/2005 | Shukh et al. ................ 360/317 |
| 7,054,106 | B2 | * | 5/2006 | Kudo et al. ............ 360/125.03 |
| 7,154,707 | B2 | * | 12/2006 | Watabe et al. .......... 360/125.33 |
| 2004/0212923 | A1 | | 10/2004 | Taguchi |

FOREIGN PATENT DOCUMENTS

| JP | 2001-250204 | 9/2001 |
| JP | 2004-295987 | 10/2004 |
| JP | 2004-326990 | 11/2004 |
| JP | 2004-348928 | 12/2004 |
| JP | 2005-018851 | 1/2005 |
| JP | 2005-100520 | 4/2005 |

OTHER PUBLICATIONS

English Machine Translation of JP 2004-348928.*

* cited by examiner

*Primary Examiner*—A. J. Heinz
(74) *Attorney, Agent, or Firm*—Oblon, Spivak, McClelland, Maier & Neustadt, P.C.

(57) ABSTRACT

A perpendicular magnetic recording element includes a recording magnetic pole film and a write shield film. The recording magnetic pole film has a yoke portion and a main magnetic pole for perpendicular recording. The main magnetic pole projects from a front end of the yoke portion to have an end on a medium-facing surface. The write shield film faces the recording magnetic pole film and has a height equal to or smaller than that of the recording magnetic pole film, as measured rearward from the medium-facing surface.

7 Claims, 16 Drawing Sheets

PERPENDICULAR MAGNETIC RECORDING ELEMENT, THIN FILM MAGNETIC HEAD, MAGNETIC HEAD DEVICE, AND MAGNETIC RECORDING/REPRODUCING APPARATUS FOR REDUCING DELETERIOUS EFFECTS OF EXTERNAL MAGNETIC FIELDS

TECHNICAL FIELD

The present invention relates to a perpendicular magnetic recording element, a thin film magnetic head, a magnetic head device, and a magnetic recording/reproducing apparatus.

BACKGROUND OF THE INVENTION

In order to eliminate the effect of an external magnetic field, particularly the effect of a magnetic field coming around from a magnetic recording medium, perpendicular (or vertical) magnetic recording heads are generally provided with a write shield film, in addition to a main magnetic pole for writing. Heretofore, the shield film provided in a read element has also been used as the write shield film, but U.S. Pat. No. 6,754,049 B1 discloses a structure in which the write shield film for the main magnetic pole is provided separately from the shield film of the read element.

However, even if the magnetic shield structure disclosed in U.S. Pat. No. 6,754,049 B1 is adopted, there is still a limit to reducing the effect of an external magnetic field, particularly the effect of a magnetic field coming around from a magnetic recording medium, upon a recording magnetic field, which leads to the problem of adjacent track erase (hereinafter referred to as ATE) or pole erase. The pole erase is the phenomenon in which a signal having been recorded by a recording magnetic pole on a magnetic recording medium becomes erased when a recording operation is not executed.

SUMMARY OF THE INVENTION

It is an object of the present invention to provide a perpendicular magnetic recording element that is effective in eliminating the problem of ATE and the problem of pole erase, and a thin film magnetic head, a magnetic head device, and a magnetic recording/reproducing apparatus using the perpendicular magnetic recording element.

In order to solve the problems set forth above, a perpendicular magnetic recording element according to the present invention includes a recording magnetic pole film and a write shield film. The recording magnetic pole film has a main magnetic pole for perpendicular recording at a front end of a yoke portion and the main magnetic pole has an end on a medium-facing surface. The write shield film faces the recording magnetic pole film and has a height equal to or smaller than that of the recording magnetic pole film, as measured rearward from the medium-facing surface.

In the perpendicular magnetic recording element according to the present invention, since the recording magnetic pole film has a main magnetic pole for perpendicular recording at a front end of a yoke portion and the main magnetic pole has an end on a medium-facing surface, as set forth above, a sufficient recording magnetic field to perform perpendicular recording can be generated at the end of the main magnetic pole by concentrating the recording magnetic field from the yoke portion to the main magnetic pole. In addition, the write shield film, which faces the recording magnetic pole film, can widely collect a magnetic flux having leaked from the main magnetic pole and recorded magnetic data on a magnetic recording medium, ensuring that the magnetic data dominated by the perpendicular component remain on the magnetic recording medium.

The above-mentioned effects and advantages are generally achieved in perpendicular magnetic recording elements of this type. In addition to the known structure described above, the feature of the present invention resides in that the write shield film has a height equal to or smaller than that of the recording magnetic pole film, as measured rearward from the medium-facing surface. This structure decreases the magnetic flux entering the write shield film from the outside to reduce the amount of magnetic flux transmitted from the write shield film to the recording magnetic pole film, thereby eliminating the problem of ATE and the problem of pole erase.

The rear end of the write shield film may be connected to the recording magnetic pole film, or the write shield film may have a smaller height than the recording magnetic pole film to have its rear end separated from the recording magnetic pole film. In the latter structure, the magnetic circuit passing through the write shield film and the recording magnetic pole film has a sufficiently high magnetic resistance to reduce the effect of an external magnetic field on the recording magnetic field, even if the external magnetic field enters the write shield film.

It is desirable that the front end of the write shield film faces the main magnetic pole across a minute distance (or write gap). This structure enables that the write shield film absorbs a part of a magnetic flux leaking from the main magnetic pole, particularly a magnetic flux leaking along the film thickness direction of the main magnetic pole, thereby steepening the gradient of magnetic field from the main magnetic pole to the magnetic recording medium. This makes it possible to improve the recording capability.

The write gap may be set equal to or less than 200 nm, preferably equal to or less than 50 nm. Setting the write gap to such a minute size ensures that the write shield film absorbs a part of a magnetic flux leaking from the main magnetic pole, particularly a magnetic flux leaking along the film thickness direction of the main magnetic pole, thereby steepening the gradient of magnetic field from the main magnetic pole to the magnetic recording medium, which makes it possible to improve the recording capability.

It is desirable that the write shield film satisfies a relationship of A1>B1 where A1 represents width and B1 represents height. In this structure, when a recording operation is not being performed, the write shield film can be stably magnetized due to its shape anisotropy along an easy axis orthogonal to the direction of the perpendicular recording magnetic field, which inhibits the occurrence of pole erase.

The perpendicular magnetic recording element according to the present invention may further include a coil film as a main component. The coil film may be combined with the recording magnetic pole film to generate a recording magnetic field. In order to ensure that the magnetomotive force due to a current passing through the coil film will act effectively on the recording magnetic pole film, it is desirable that a magnetic film is disposed at a rear end of the recording magnetic pole film and protrudes from one surface thereof. The coil film may wind around the protuberant magnetic film. In this case, the coil film may have a spiral form.

In an alternative to the spiral form, the coil film may wind around the recording magnetic pole film in a helical form.

The perpendicular magnetic recording element according to the present invention may constitute, in combination with a slider, a thin film magnetic head. As the thin film magnetic head, there may be adopted a so-called composite type including a read element in addition to the above-mentioned perpendicular magnetic recording element.

Furthermore, the thin film magnetic head may constitute, in combination with a head support device, a magnetic head device such as a head gimbal assembly (HGA). Still furthermore, the magnetic head device may constitute, in combination with a magnetic disk, a magnetic recording/reproducing apparatus (or magnetic disk apparatus).

As has been described hereinabove, the present invention provides a perpendicular magnetic recording element that is effective in eliminating the problem of ATE and the problem of pole erase by reducing the effect of an external magnetic field, particularly the effect of a magnetic field coming around from a magnetic recording medium, upon a recording magnetic field, and a thin film magnetic head, a magnetic head device, and a magnetic recording/reproducing apparatus using the perpendicular magnetic recording element.

The present invention will be more fully understood from the detailed description given hereinbelow and the accompanying drawings which are given by way of illustration only, and thus not to be considered as limiting the present invention.

DESCRIPTION OF THE PREFERRED EMBODIMENTS

1. Perpendicular Magnetic Recording Element and Thin Film Magnetic Head

Figure 1:
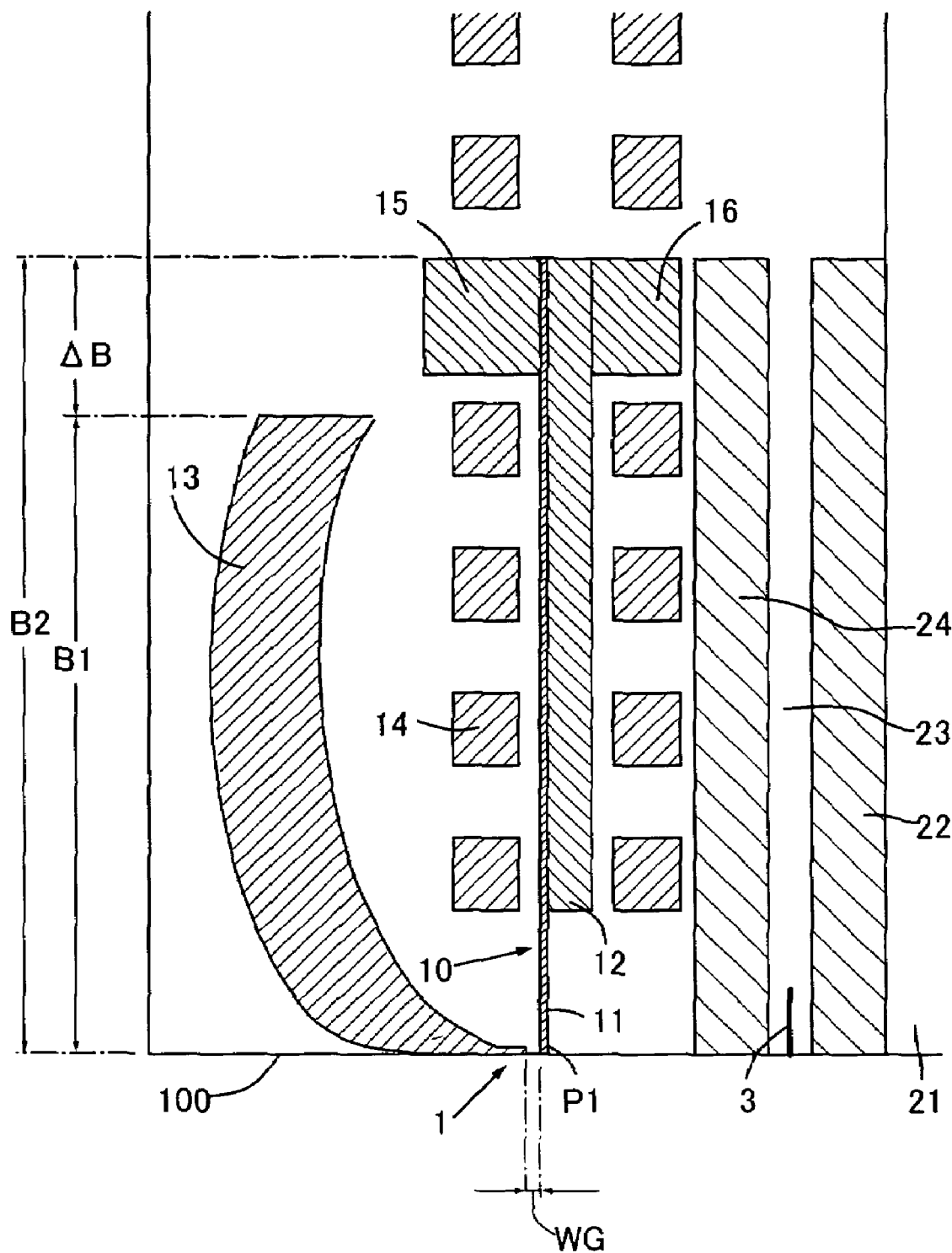
FIG. 1 is a sectional view of a thin film magnetic head incorporating a perpendicular magnetic recording element according to one embodiment of the present invention.
Figure 3:
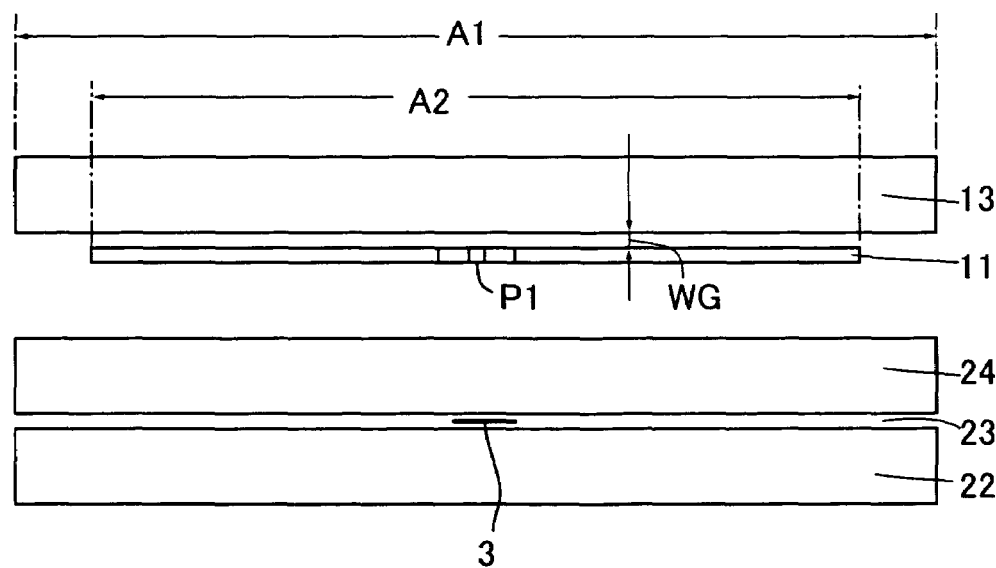
FIG. 3 is an end view showing the front of the magnetic circuit of FIG. 2.

Referring to FIGS. 1 and 3, an insulating film constituted of, for instance, a metal oxide or an organic insulating material is disposed over the blank area surrounding individual components. More specifically, the insulating film may be constituted of an inorganic insulating material such as $Al_2O_3$, $SiO_2$, AlN, DLC, etc. or a resist.

In the shown thin film magnetic head, a perpendicular magnetic recording element 1 includes a recording magnetic pole film 10 and a write shield film 13. The perpendicular magnetic recording element 1 further includes a coil film 14 as a main component. In the shown embodiment, furthermore, the thin film magnetic head is of a composite type including a reproducing element 3.

The recording magnetic pole film 10 includes a yoke portion YK and a main magnetic pole P1 for perpendicular recording. The yoke portion YK is constituted of a laminated film having a first magnetic film 11 and a second magnetic film 12. The first and second magnetic films 11, 12 may have any compositions, film thicknesses, etc., which have been proposed or will be proposed. For instance, they may be constituted of a magnetic material selected from NiFe, CoFe, CoFeN, CoNiFe, FeN, FeZrN, etc.

The first magnetic film 11 is thinner than the second magnetic film 12 and has a narrow front end portion projecting from the second magnetic film 12. This projecting narrow portion forms a main magnetic pole P1. The front end surface of the main magnetic pole P1 is located on the plane containing a medium-facing surface 100. The second magnetic film 12 has a large film thickness so as to transmit a sufficient magnetic flux to the main magnetic pole P1. The yoke portion YK of the recording magnetic pole film 10 extends widely behind the main magnetic pole P1.

The write shield film 13 faces the yoke portion YK and the main magnetic pole P1. In more detail, the front end surface of the write shield film 13 and the front end surface of the main magnetic pole P1, which lie on the same plane, are spaced apart a minute distance WG that is equal to or less than 200 nm, preferably equal to or less than 50 nm. As measured rearward from the medium-facing surface 100, the write shield film 13 should have a height B1 equal to or smaller than a height B2 of the recording magnetic pole film 10, i.e., B1=B2 (see FIG. 2). In the shown embodiment, B1<B2, and therefore, a gap Δ B due to the difference in height (B2 minus B1) is provided behind the write shield film 13. On its rear side, accordingly, the write shield film 13 is spaced apart from a connecting portion 15 by the gap ΔB.

Figure 2:
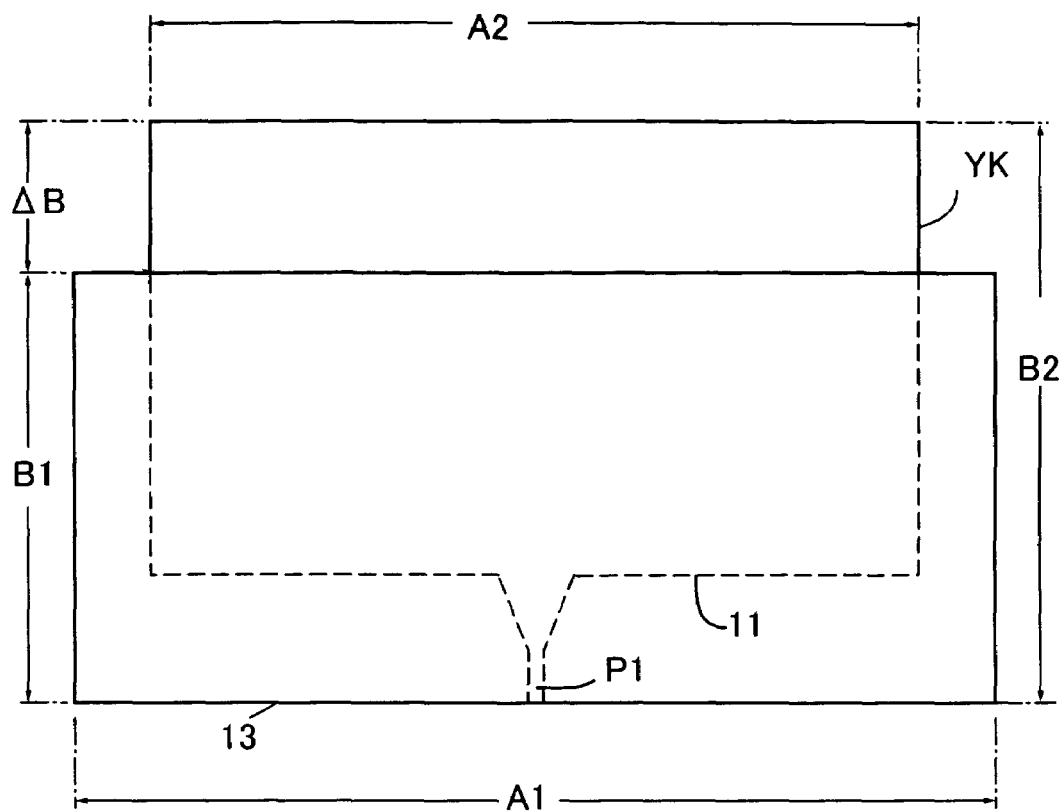
FIG. 2 is a plan view showing only a magnetic circuit of the thin film magnetic head shown in FIG. 1.

In addition, as shown in FIGS. 2 and 3, the write shield film 13 has a width A1 which is preferably larger than a width A2 of the recording magnetic pole film 10 to project from both sides of the recording magnetic pole film 10 in the widthwise direction. Concerning the shape of the write shield film 13, furthermore, it is desirable that the width A1 is larger than the height B1, i.e., A1>B1.

The magnetic flux from the main magnetic pole P1 of the recording magnetic pole film 10 is gathered at the write shield film 13 which spreads widely. The write shield film 13 may have any composition, film thickness, etc., which have been proposed or will be proposed. For instance, it may be constituted of a magnetic material selected from NiFe, CoFe, CoFeN, CoNiFe, FeN, FeZrN, etc.

The coil film 14 is disposed between the second magnetic film 12 and the write shield film 13 so as to wind around the connecting portion 15 in a spiral form. In an alternative to the shown spiral form, the coil film 14 may have another mode or structure. For instance, the coil film 14 may wind around the recording magnetic pole film 10 in a helical form. Typically, the coil film 14 may be constituted of a Cu film.

The reproducing element 3 may be constituted of a giant magnetoresistance element (or GMR element) or a ferromagnetic tunnel Junction element. The reproducing element 3 is disposed in an insulating film 23 between a first read shield film 22 and a second read shield film 24. The first read shield film 22 is disposed on a slider substrate 21. In the shown embodiment, furthermore, a magnetic film 16 is disposed adjacent to the recording magnetic pole film 10, between the second read shield film 24 and the recording magnetic pole film 10. The second read shield film 24 preferably has a layered structure in which a nonmagnetic film of about 300 nm is sandwiched.

In the perpendicular magnetic recording element 1, since the recording magnetic pole film 10 has the main magnetic pole P1 for perpendicular recording at the front end of the yoke portion YK and the main magnetic pole P1 has its end on the medium-facing surface 100, as set forth above, a sufficient recording magnetic field to perform perpendicular recording can be generated at the end of the main magnetic pole P1 by concentrating the recording magnetic field from the yoke portion YK to the main magnetic pole P1.

In addition, the write shield film 13, which faces the yoke portion YK and the main magnetic pole P1 of the recording magnetic pole film 10, can widely collect a magnetic flux having leaked from the main magnetic pole P1 and recorded magnetic data on a magnetic recording medium, ensuring that the magnetic data dominated by the perpendicular component remain on the magnetic recording medium. Due to its inherent shielding effect, furthermore, the write shield film 13 can absorb an external magnetic field, particularly a magnetic flux coming around from the magnetic recording medium, reducing the effect on the recording magnetic field.

The above-mentioned effects and advantages are generally achieved in perpendicular magnetic recording elements of this type. In addition to the known structure described above, the feature of the present invention resides in that the height B1 of the write shield film 13 is equal to or smaller than the height B2 of the recording magnetic pole film 10, as measured rearward from the medium-facing surface 100. This structure decreases the magnetic flux entering the write shield film 13 from the outside to reduce the amount of magnetic flux transmitted from the write shield film 13 to the recording magnetic pole film 10, which makes it possible to eliminate the problem of ATE and the problem of pole erase.

In the shown embodiment, the height B1 of the write shield film 13 relative to the medium-facing surface 100 is smaller than the height B2 of the recording magnetic pole film 10, and the rear end of the write shield film 13 is spaced apart from the recording magnetic pole film 10 by the gap ΔB. In this structure, the magnetic circuit passing through the write shield film 13 and the recording magnetic pole film 10 has a sufficiently higher shape anisotropy to reduce the effect of an external magnetic field on the recording magnetic field, even if the external magnetic field enters the write shield film 13.

The write shield film 13 and the main magnetic pole P1 are spaced apart a minute distance (hereinafter referred to as a write gap) WG. This structure enables that the write shield film 13 absorbs a magnetic flux leaking from the main magnetic pole P1 to the write shield film 13, thereby steepening the gradient of magnetic field from the main magnetic pole P1 to the magnetic recording medium. This improves the recording capability.

The write gap WG is set equal to or less than 200 nm, preferably equal to or less than 100 nm, more preferably equal to or less than 50 nm. Setting the write gap WG to such a minute size ensures that the write shield film 13 absorbs a part of a magnetic flux leaking from the main magnetic pole P1, particularly a magnetic flux leaking along the film thickness direction of the main magnetic pole P1, thereby steepening the gradient of magnetic field from the main magnetic pole P1 to the medium, which makes it possible to certainly eliminate the problem of ATE and the problem of pole erase. The lower limit of the write gap WG is appropriately set within the range between 50 nm and 0 nm, for instance, around 20 nm.

The above-mentioned structural features and effects and advantages thereof will be described in more detail with reference to test data.

Furthermore, the write shield film 13 satisfies a relationship of A1>B1 where A1 represents width and B1 represents height. In this structure, when a recording operation is not being performed, the write shield film 13 can be stably magnetized due to its shape anisotropy along an easy axis perpendicular to the direction of the perpendicular recording magnetic field, which inhibits the occurrence of pole erase.

Various embodiments are possible for structure and relative position of the above-described components as will be described hereinbelow. It should be noted that the portions corresponding to the components shown in FIGS. 1 to 3 are designated by the same reference numerals, and a duplicate description will be omitted.

Figure 4:
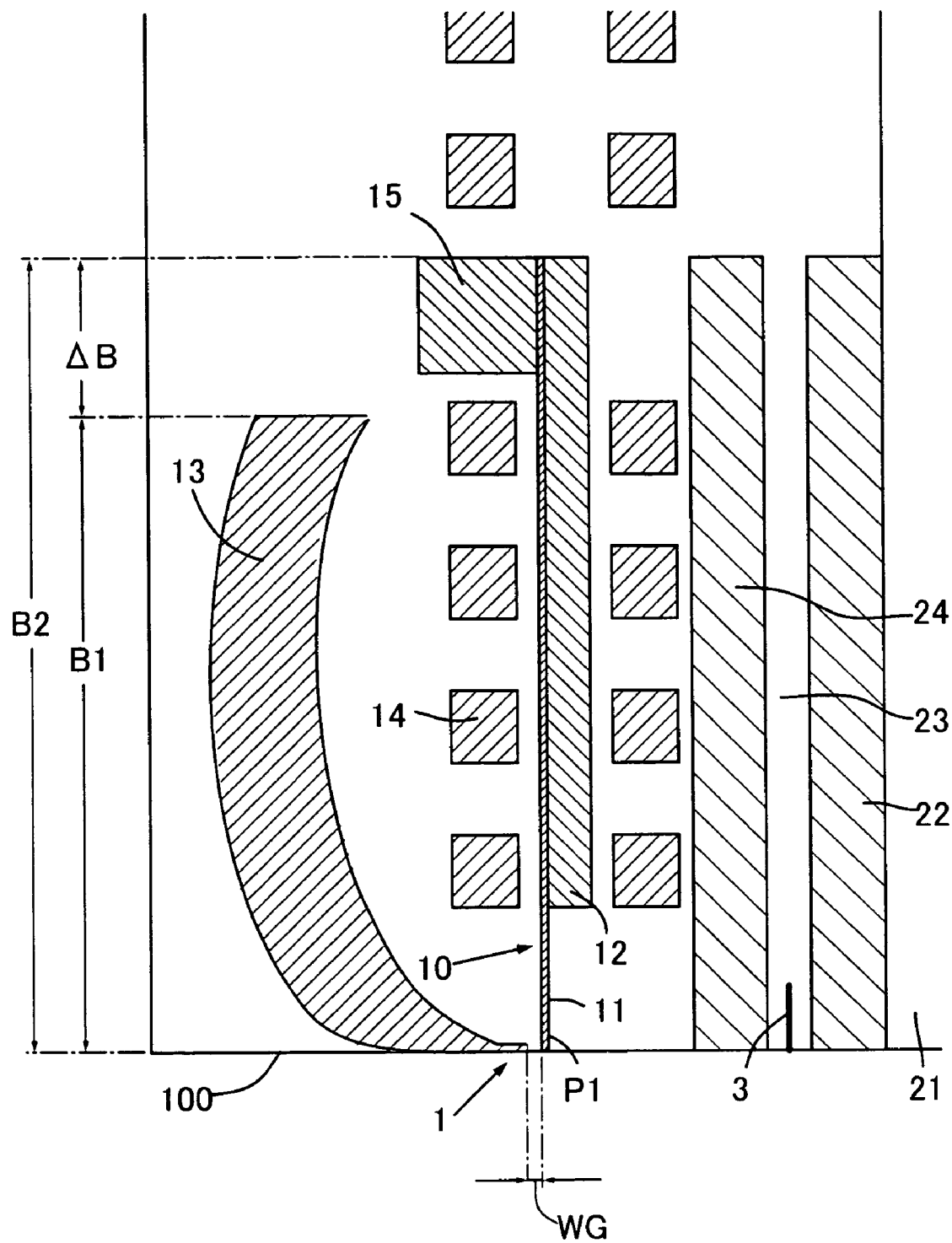
FIG. 4 is a sectional view of a thin film magnetic head incorporating a perpendicular magnetic recording element according to another embodiment of the present invention.

FIG. 4 shows an embodiment in which the magnetic film 16 is omitted, which is disposed between the second read shield film 24 and the recording magnetic pole film 10 in the embodiment shown in FIGS. 1 to 3. This structure is effective in improving the magnetic separation between the magnetic circuit of the recording element 1 and a magnetic shielding circuit for the reproducing element 3.

In an alternative to the spiral form, the coil film 14 may have a helical form. In case of the helical form, since the coil winding area is limited around the recording magnetic pole film 10, there is obtained the advantage of reducing the occupying area of the coil.

Figure 5:
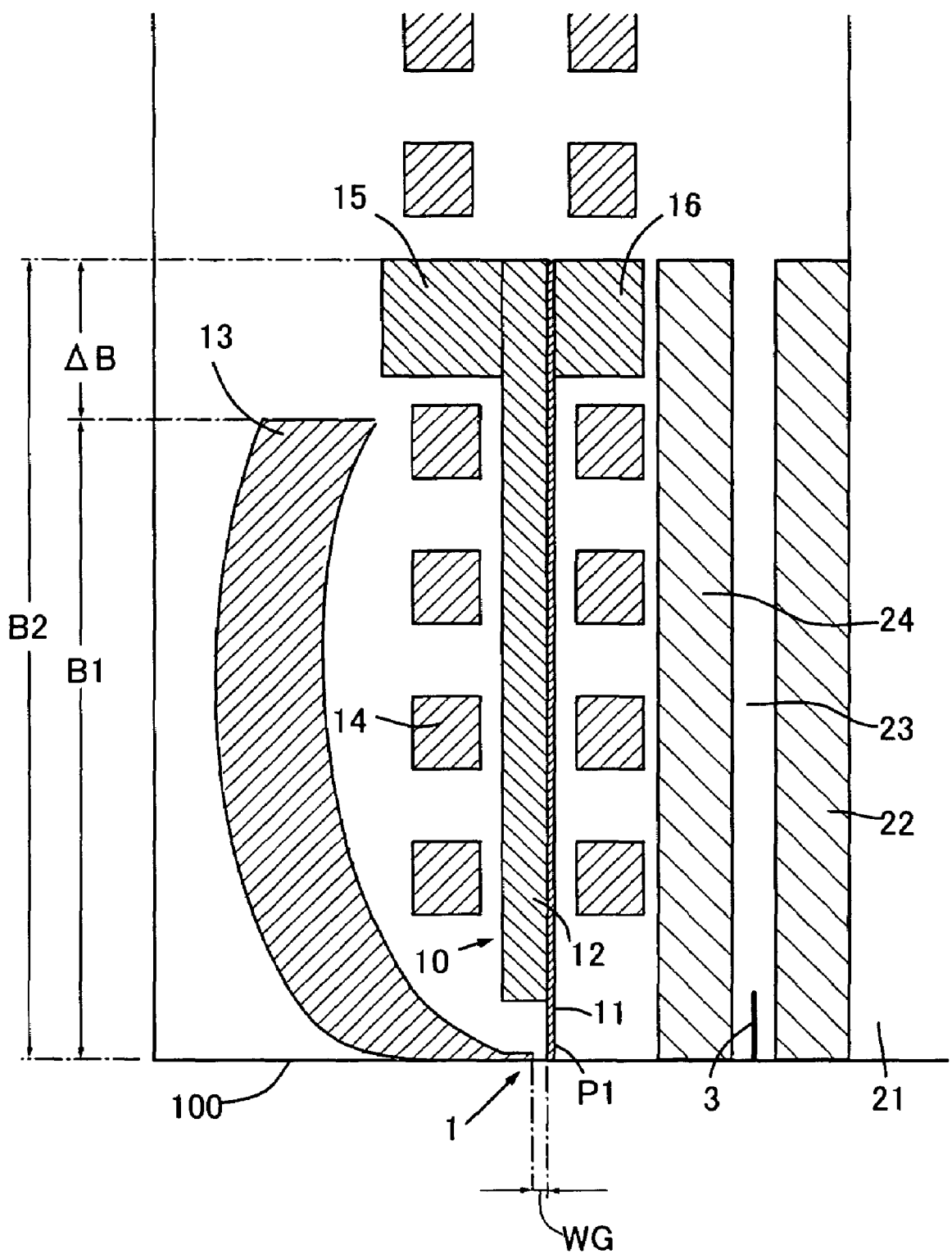
FIG. 5 is a sectional view of a thin film magnetic head incorporating a perpendicular magnetic recording element according to still another embodiment of the present invention.

FIG. 5 shows an embodiment in which the second magnetic film 12, which constitutes the recording magnetic pole film 10 in combination with the first magnetic film 11 that forms the main magnetic pole P1, is disposed on the side of the write shield film 13. In this structure, since a leakage magnetic flux generated from the front end of the second magnetic film 12 can be absorbed by the write shield film 13, the main magnetic pole P1 can generate a more appropriate recording magnetic field.

Figure 6:
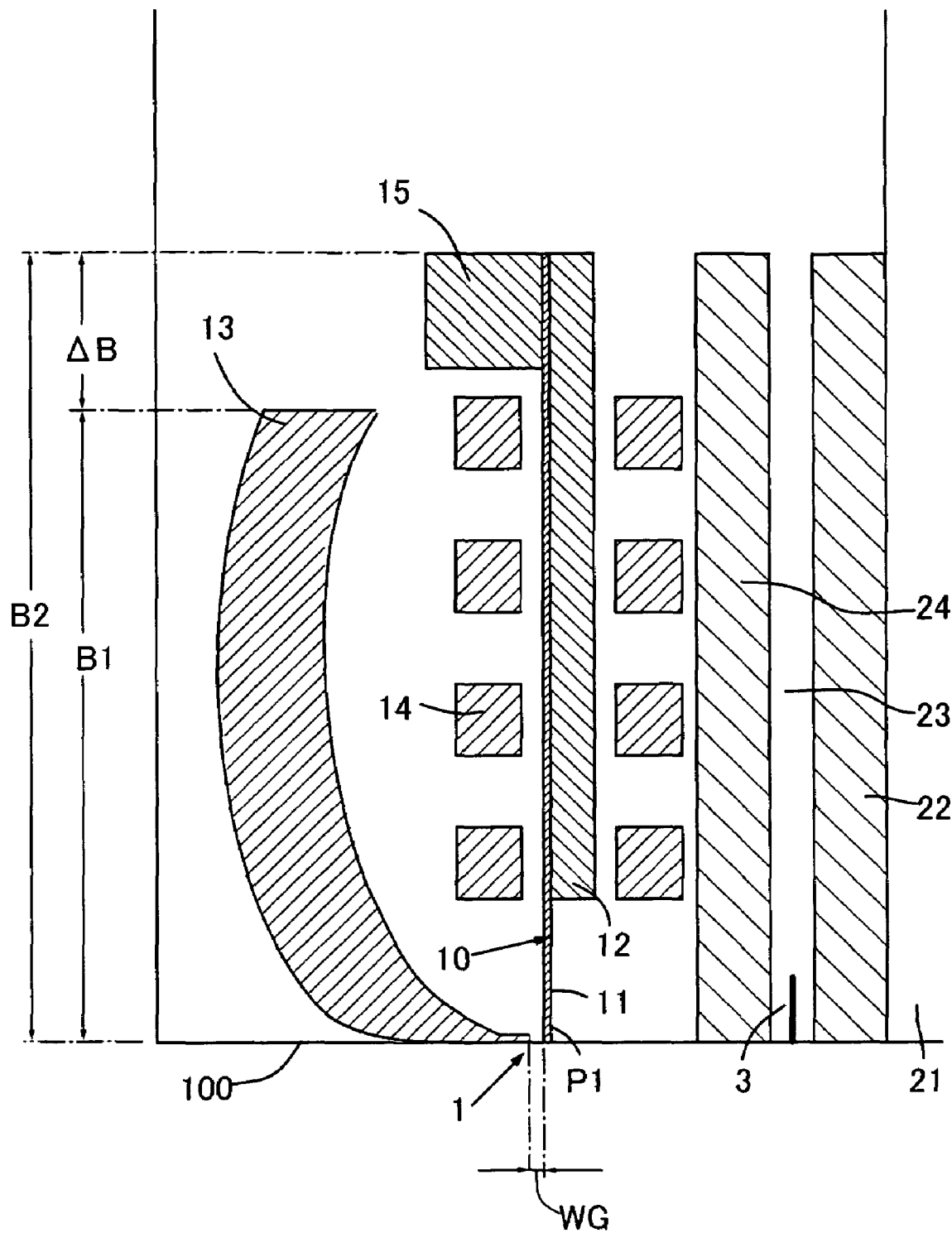
FIG. 6 is a sectional view of a thin film magnetic head incorporating a perpendicular magnetic recording element according to still another embodiment of the present invention.

FIG. 6 shows an embodiment in which the helical form is adopted and the magnetic film 16 is omitted, which is disposed between the second read shield film 24 and the recording magnetic pole film 10 in the embodiment shown in FIGS. 1 to 3. This structure is effective in improving the magnetic separation between the magnetic circuit of the recording element 1 and a magnetic shielding circuit for the reproducing element 3.

Figure 7:
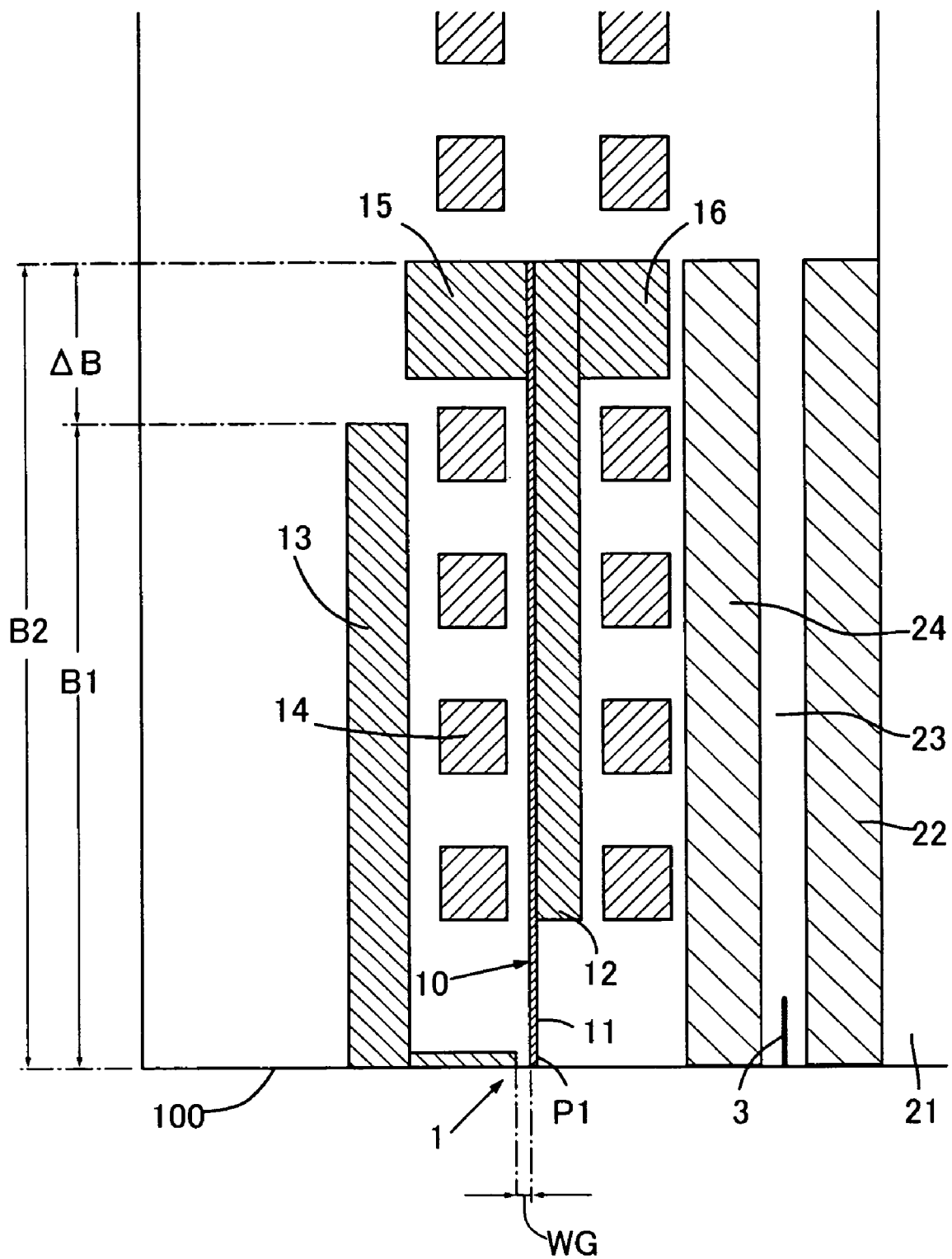
FIG. 7 is a sectional view of a thin film magnetic head incorporating a perpendicular magnetic recording element according to still another embodiment of the present invention.

FIG. 7 shows a so-called planar-type thin film magnetic head based on the structure shown in FIGS. 1 to 3, in which the write shield film 13 is replaced by a planar film. Although illustration is omitted, the embodiments shown in FIGS. 4 to 6 may also be modified into a planar type.

In the foregoing embodiments, the height B1 of the write shield film 13 as measured rearward from the medium-facing surface 100 is smaller than the height B2 of the recording magnetic pole film 10, i.e., B1<B2, but it is also possible that B1=B2. Such embodiments will be described hereinbelow.

Figure 8:
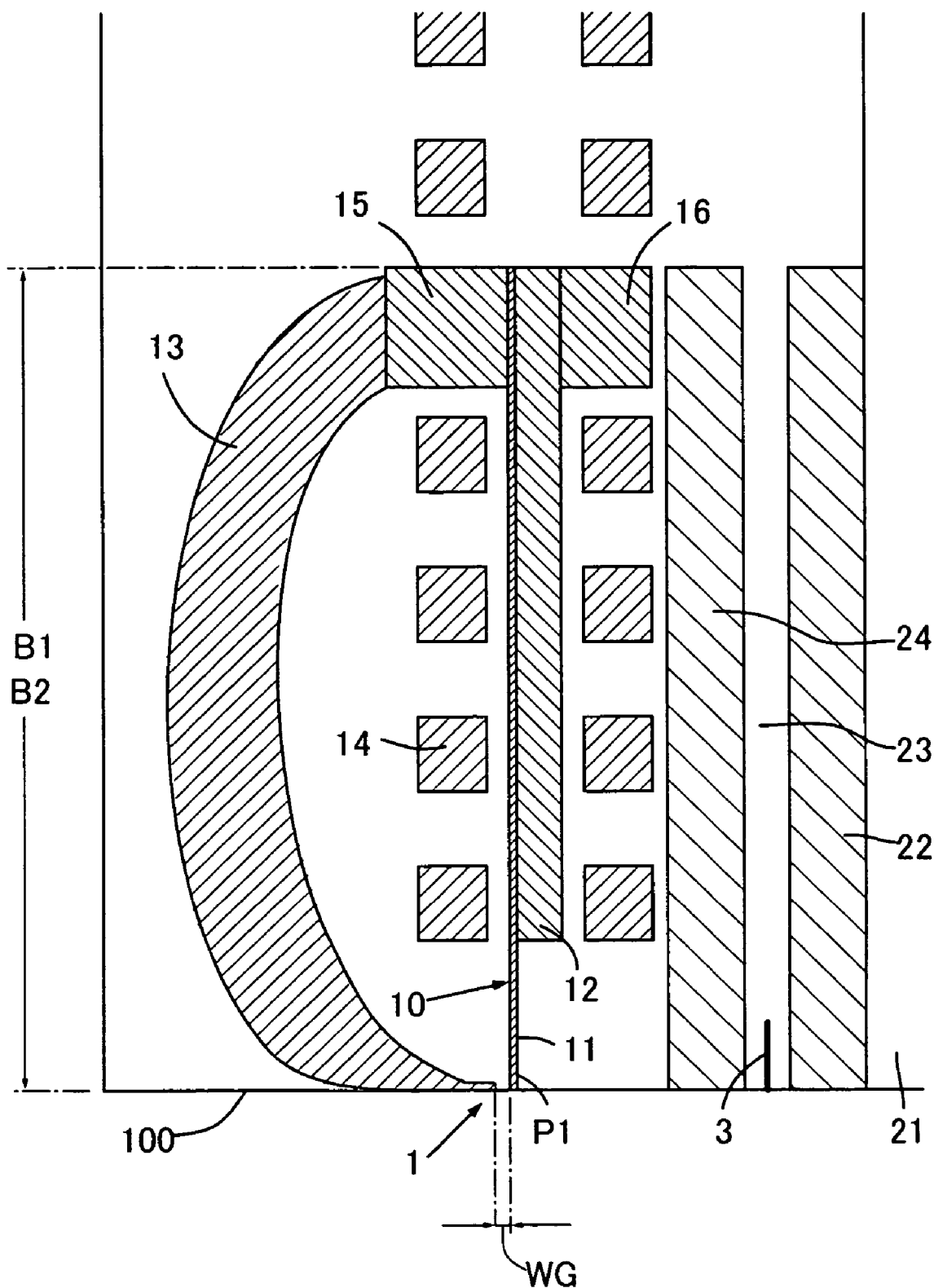
FIG. 8 is a sectional view of a thin film magnetic head incorporating a perpendicular magnetic recording element according to still another embodiment of the present invention.

FIG. 8 shows an embodiment corresponding to FIGS. 1 to 3, in which the coil film 14 has a spiral form and the rear end of the write shield film 13 is connected to the connecting portion 15 to substantially satisfy the relationship of B1=B2.

Figure 9:
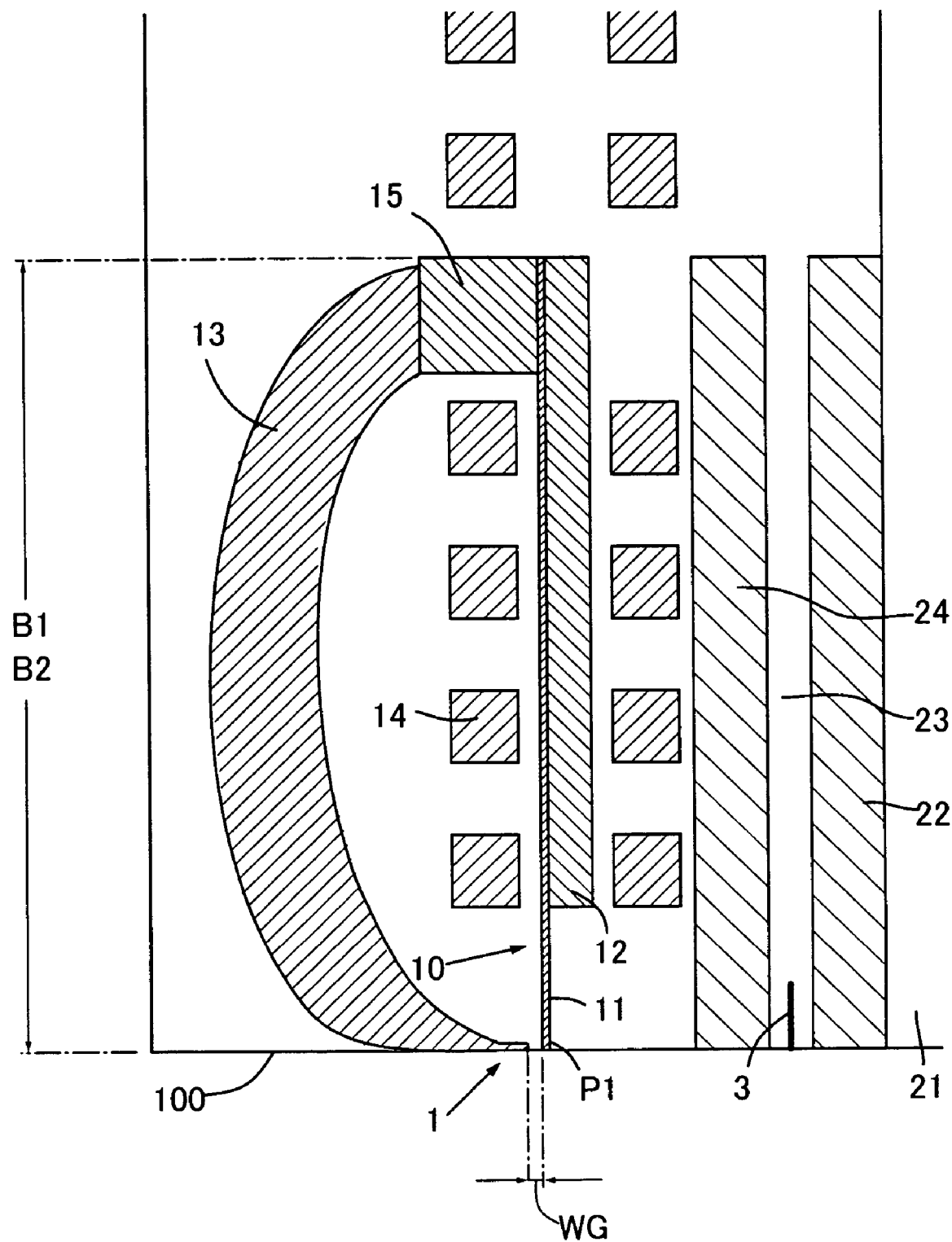
FIG. 9 is a sectional view of a thin film magnetic head incorporating a perpendicular magnetic recording element according to still another embodiment of the present invention.

FIG. 9 shows an embodiment corresponding to FIG. 4, in which the coil film 14 has a spiral form and the rear end of the write shield film 13 is connected to the connecting portion 15 to substantially satisfy the relationship of B1=B2.

Figure 10:
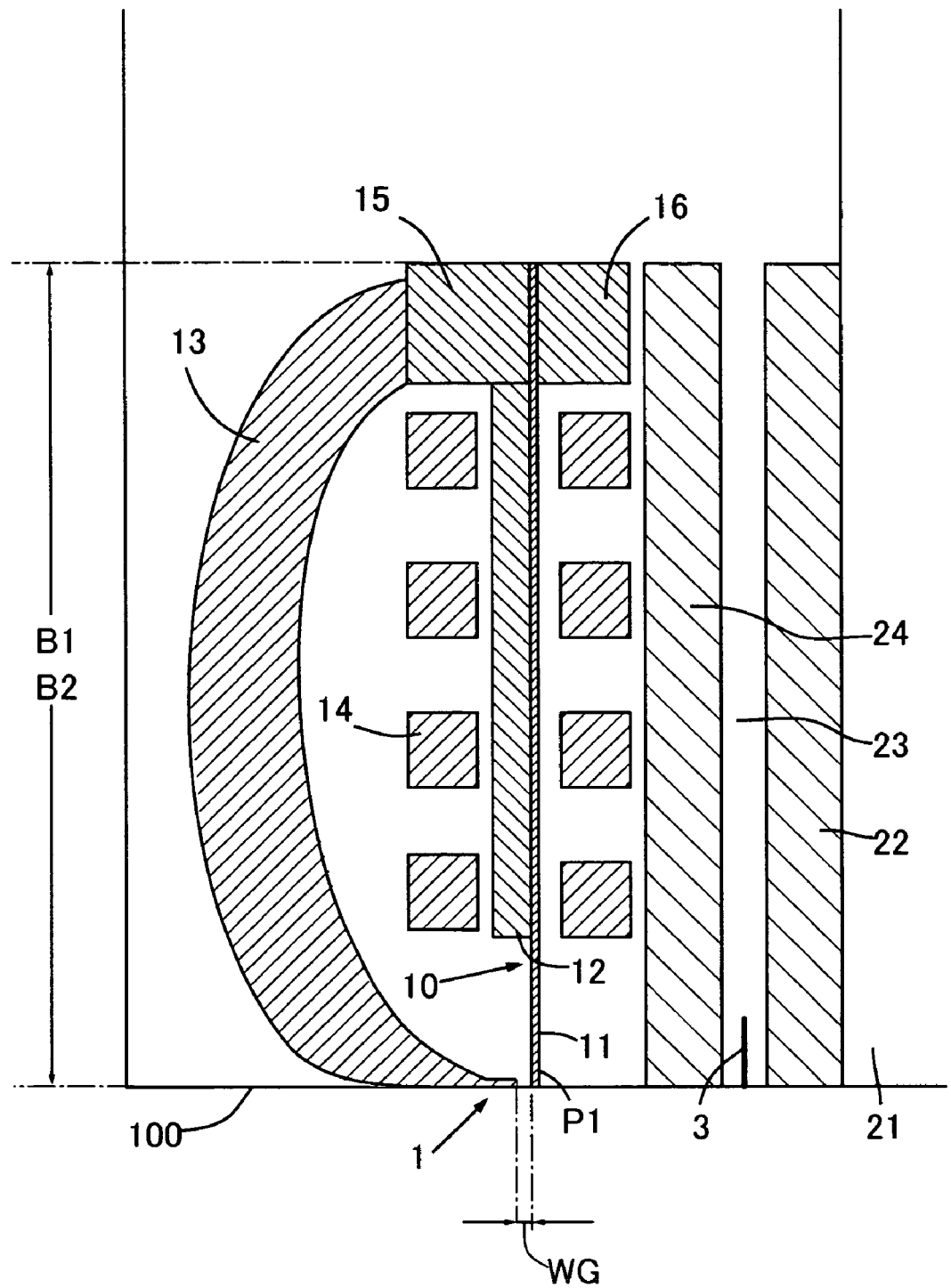
FIG. 10 is a sectional view of a thin film magnetic head incorporating a perpendicular magnetic recording element according to still another embodiment of the present invention.

FIG. 10 shows an embodiment corresponding to FIG. 5, in which the coil film 14 has a helical form and the rear end of the write shield film 13 is connected to the connecting portion 15 to substantially satisfy the relationship of B1=B2. Even in this case, the amount of magnetic flux from the write shield film 13 to the recording magnetic pole film 10 decreases to reduce ATE, as compared with the prior art where the rear end of the write shield film 13 extends further rearward beyond the connecting portion 15.

Figure 11:
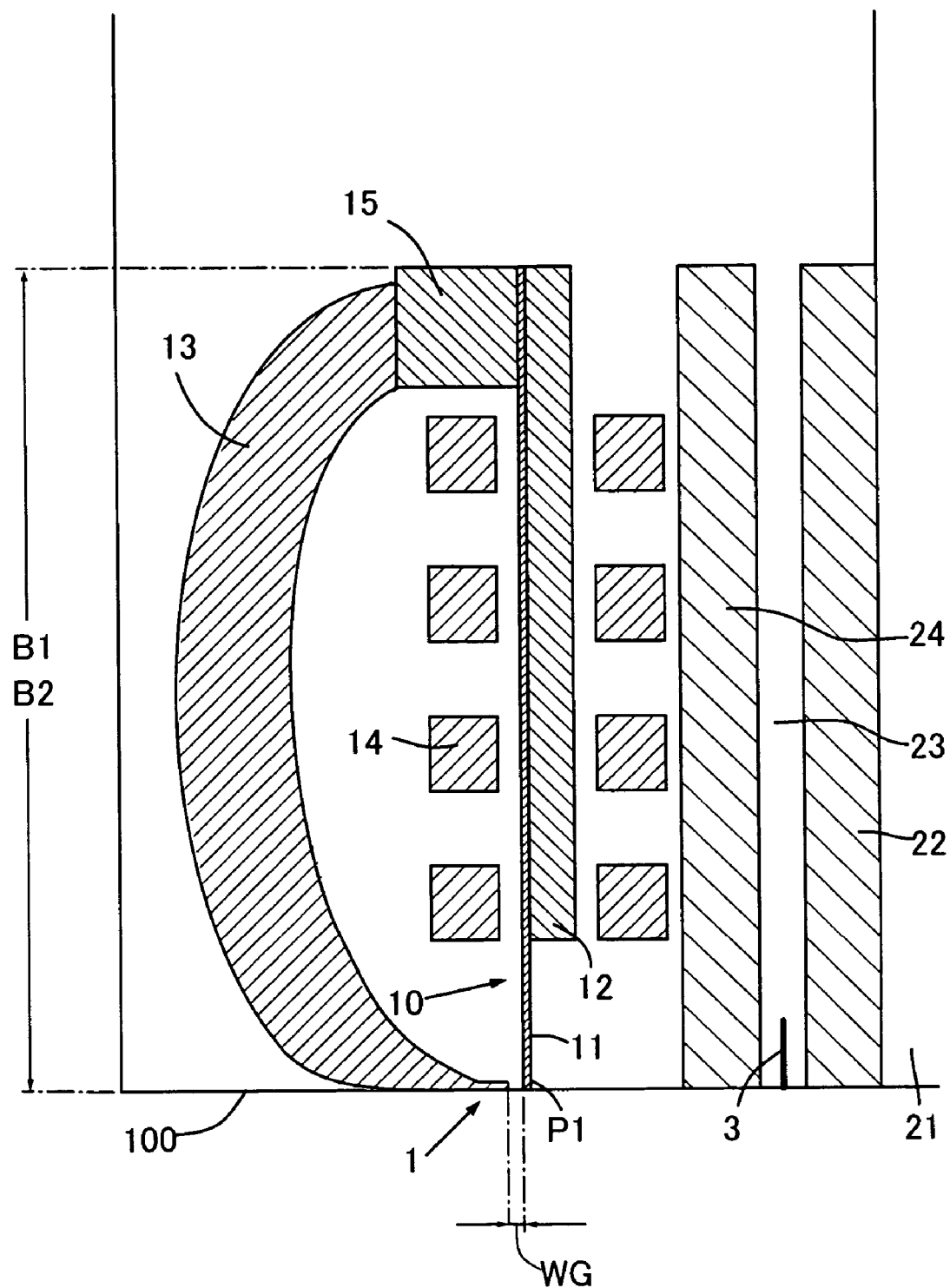
FIG. 11 is a sectional view of a thin film magnetic head incorporating a perpendicular magnetic recording element according to still another embodiment of the present invention.

FIG. 11 shows an embodiment corresponding to FIG. 6, in which the coil film 14 has a helical form and the rear end of the write shield film 13 is connected to the connecting portion 15 to substantially satisfy the relationship of B1=B2.

Figure 12:
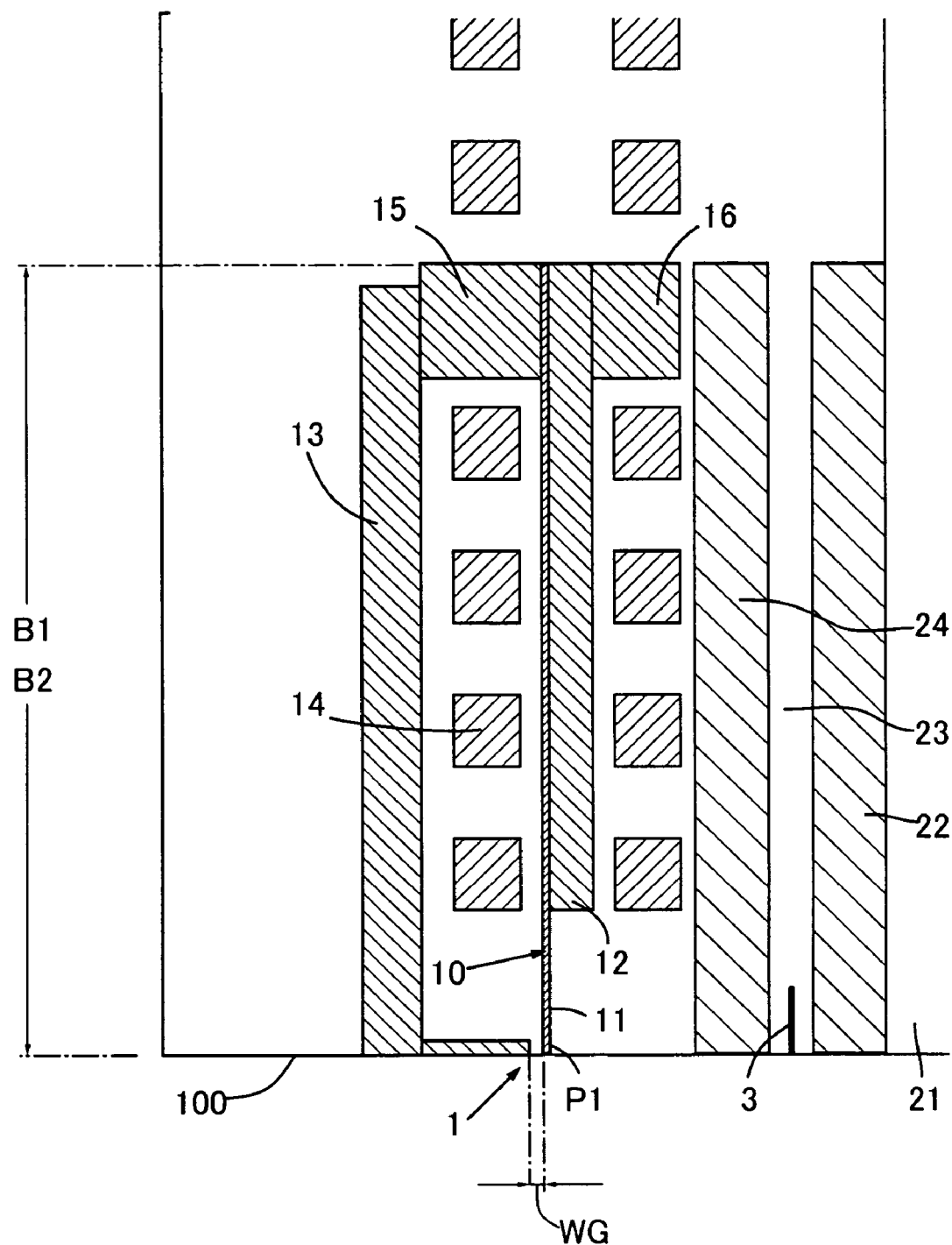
FIG. 12 is a sectional view of a thin film magnetic head incorporating a perpendicular magnetic recording element according to still another embodiment of the present invention.

FIG. 12 shows a planar-type thin film magnetic head. Although illustration is omitted, the embodiments shown in FIGS. 9 to 11 may also be modified into a planar type.

Also in the embodiments shown in FIGS. 8 to 12, the amount of magnetic flux from the write shield film 13 to the recording magnetic pole film 10 decreases to reduce ATE, as compared with the prior art where the rear end of the write shield film 13 extends further rearward beyond the connecting portion 15.

Next, the characteristics of the thin film magnetic head shown in FIGS. 1 to 3 (hereinafter referred to as an inventive sample) and the characteristics of a conventional thin film magnetic head (hereinafter referred to as a comparative sample) will be described with reference to data. In both the inventive sample and the comparative sample, the main magnetic pole P1 was constituted of FeCoNi, the first and second read shield films 22, 24 were constituted of NiFe, and the write shield film 13 was constituted of CoNiFe. The comparative sample had the same structure as the embodiment shown in FIGS. 1 to 3, except that the rear end of the write shield film 13 was extended further rearward beyond the connecting portion 15.

Figure 13:
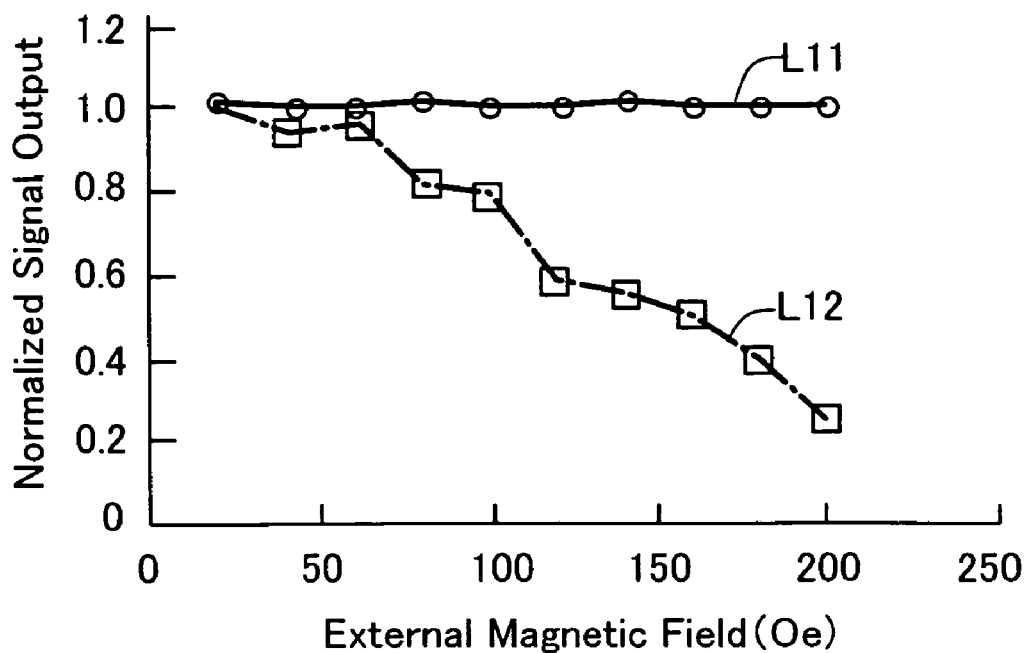
FIG. 13 is a graph showing the dependence of on-track signal output on external magnetic field.

FIG. 13 is a graph showing the dependence of on-track signal output on external magnetic field. The axis of ordinate represents normalized signal output and the axis of abscissa represents external magnetic field (Oe). The curve L11 shows the characteristics of the inventive sample, while the curve L12 shows the characteristics of the comparative sample.

The test was conducted by applying an external magnetic field perpendicular to the medium-facing surface of the thin film magnetic head to measure signal intensity changes before and after the application of magnetic field.

Referring to FIG. 13, the comparative sample had a remarkable decrease in signal output around the point where the external magnetic field exceeded 100 (Oe), as indicated by the characteristics L12. This is presumably due to that the rear end of the write shield film, which was extended further rearward beyond the connecting portion, could collect the external magnetic field more easily, which contributed to erasing the signal.

On the other hand, the inventive sample generated a constant signal output regardless of the change in external magnetic field, as indicated by the characteristics L11. This exemplifies that a stable signal output can be obtained in an on-track condition in the present invention, regardless of the change in external magnetic field. Although similar results were obtained for the thin film magnetic heads shown in FIGS. 4 to 12, they are not shown in FIG. 13 so as to avoid obscurity due to overlap of data.

Figure 14:
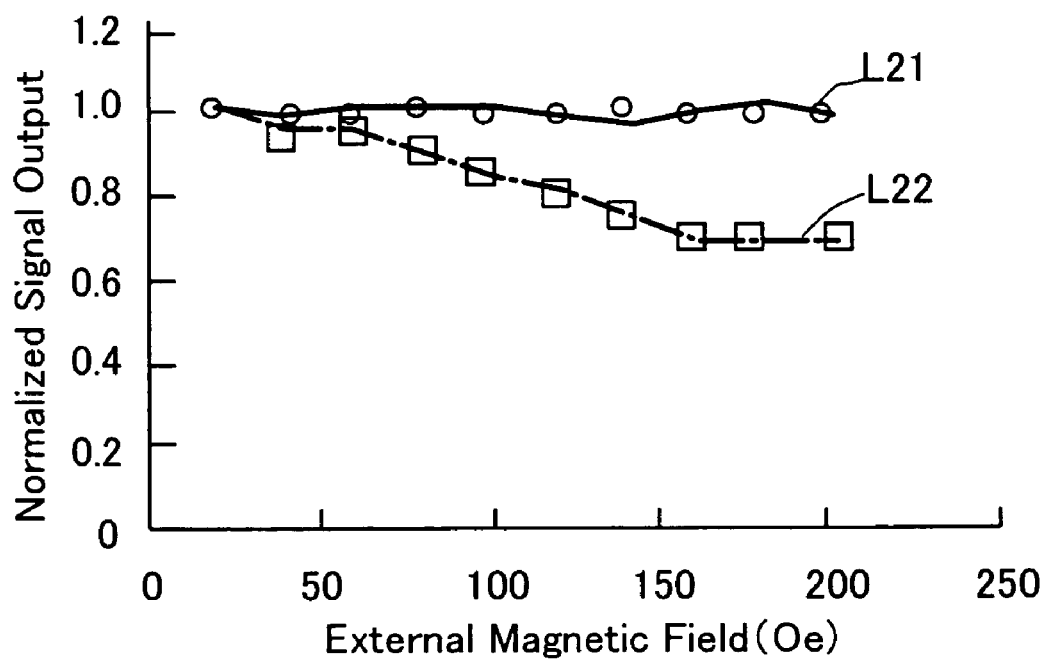
FIG. 14 is a graph showing the dependence of ATE on external magnetic field.

FIG. 14 is a graph showing the dependence of ATE on external magnetic field. The axis of ordinate represents normalized signal output and the axis of abscissa represents external magnetic field (Oe). The curve L21 shows the characteristics of the inventive sample, while the curve L22 shows the characteristics of the comparative sample.

The test was conducted by applying an external magnetic field perpendicular to the medium-facing surface of the thin film magnetic head to measure signal intensity changes in adjacent track before and after the application of magnetic field.

Referring to FIG. 14, the comparative sample had a remarkable decrease in signal output around the point where the external magnetic field exceeded 50 (Oe), as indicated by the characteristics L22. This is presumably due to that the rear end of the write shield film, which was extended further rearward beyond the connecting portion, could collect the external magnetic field more easily, which contributed to causing ATE.

On the other hand, the inventive sample generated a constant signal output regardless of the change in external magnetic field, as indicated by the characteristics L21. This exemplifies that ATE hardly increases or decreases in the present invention, regardless of the change in external magnetic field. Although similar results were obtained for the thin film magnetic heads shown in FIGS. 4 to 12, they are not shown in FIG. 14 so as to avoid obscurity due to overlap of data.

Figure 15:
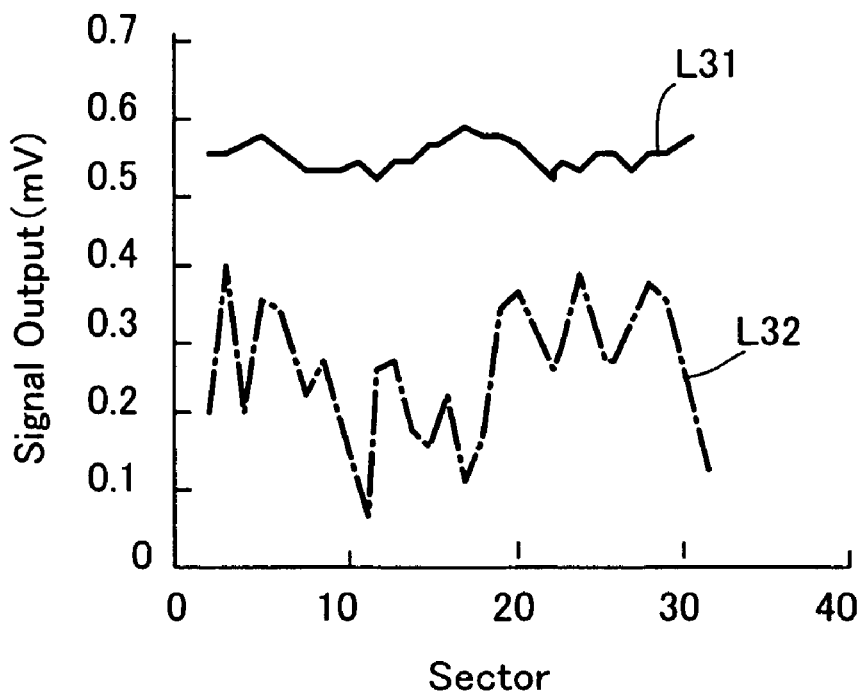
FIG. 15 is a graph showing the pole erase characteristics of a conventional perpendicular magnetic recording element.
Figure 16:
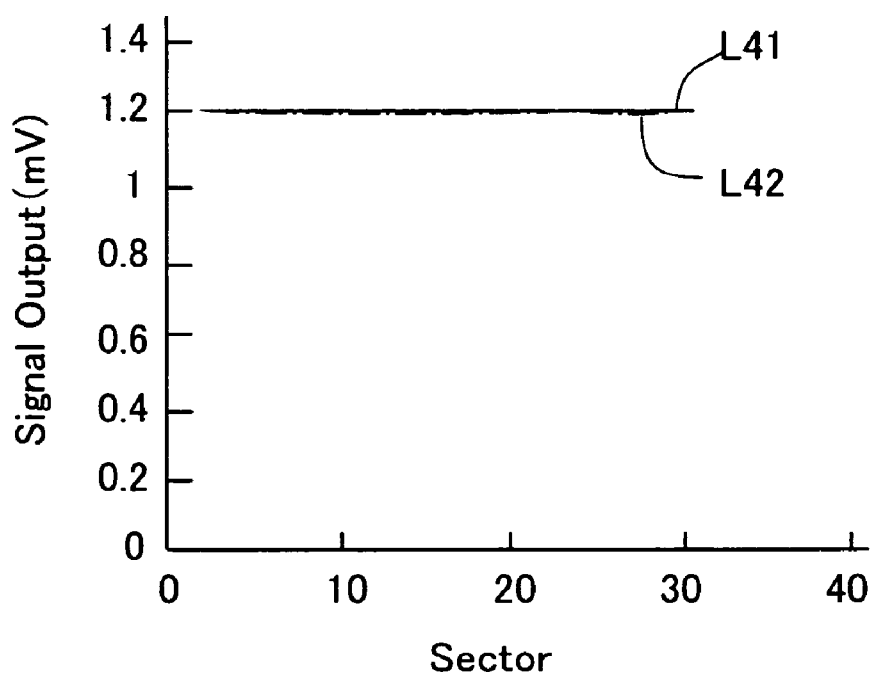
FIG. 16 is a graph showing the pole erase characteristics of a perpendicular magnetic recording element according to one embodiment of the present invention.

FIG. 15 is a graph showing the pole erase characteristics of the comparative sample, and FIG. 16 is a graph showing the pole erase characteristics of the inventive sample. The axis of ordinate represents signal output and the axis of abscissa represents sectors on a magnetic disk. Prior to the test, a high-frequency signal was recorded on the magnetic disk for a single track and divided into 70 sectors, and then, high-frequency signal output was measured for each sector (hereinafter referred to as pre-test measurement). Thereafter, the high-frequency signal was overwritten with a low-frequency signal at the beginning of each sector, and then, residual signal output of the high-frequency signal was measured (hereinafter referred to as post-test measurement).

In FIGS. 15 and 16, the curves L31 and L41 show the results of the pre-test measurement, while the curves L32 and L42 show the results of the post-test measurement. The comparative sample used for this test was the same as described above.

Referring to FIG. 15, the comparative sample had a large gap between the pre-test measurement data L31 and the post-test measurement data L32. Therefore, it is seen that pole erase occurred in all the sectors.

On the other hand, the inventive sample has little difference in pole erase between the pre-test measurement and the post-test measurement, as indicated by the overlap of the data L41 and the data L42. This exemplifies that pole erase hardly occurs in the present invention. Although similar results were obtained for the thin film magnetic heads shown in FIGS. 4 to 12, they are not shown in FIGS. 15 and 16 so as to avoid obscurity due to overlap of data.

Figure 17:
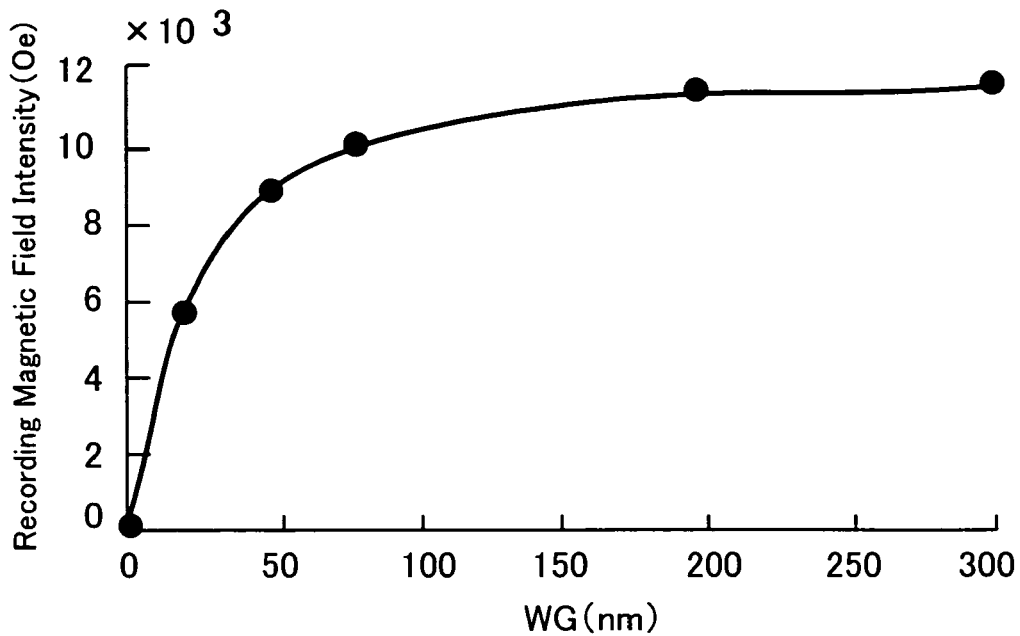
FIG. 17 is a diagram plotting the relation between write gap and recording magnetic field intensity.
Figure 18:
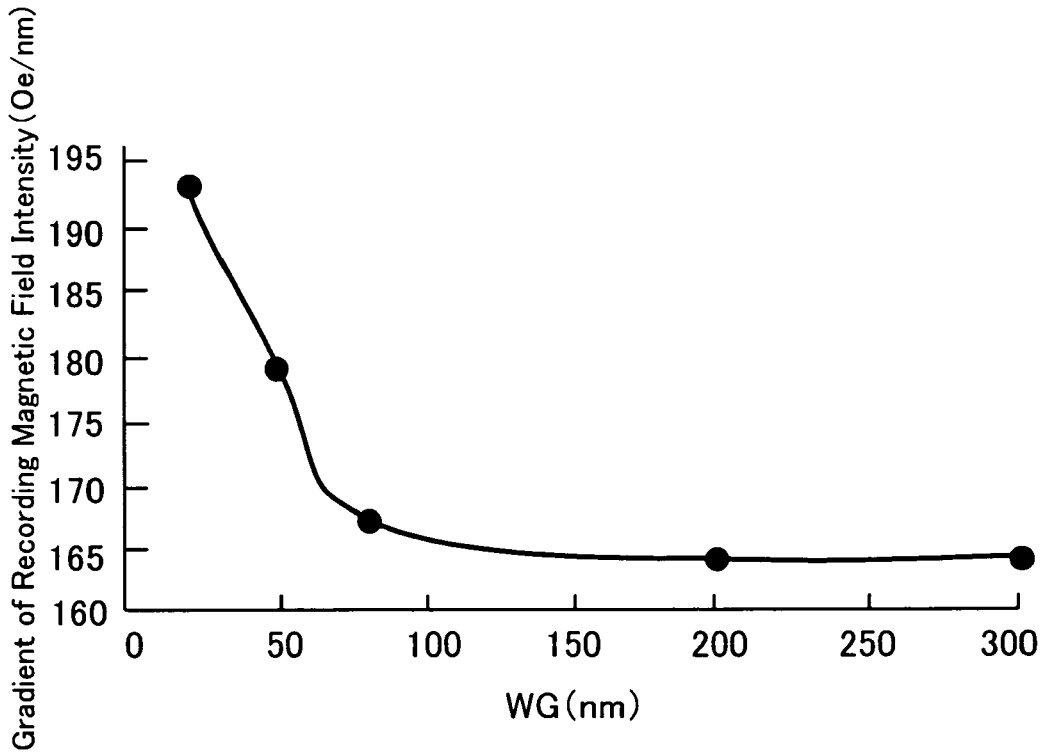
FIG. 18 is a diagram plotting the relation between write gap and gradient of recording magnetic field intensity.

FIG. 17 is a diagram plotting the test data about write gap WG (nm) and recording magnetic field intensity (Oe), and FIG. 18 is a diagram plotting the test data about write gap WG (nm) and gradient of recording magnetic field intensity (Oe/nm). The data, which was calculated by finite element method, was obtained at a point coinciding with both the center of the track width and the center of the write gap WG when 40 mA of current is applied to the coil film.

Referring to FIGS. 17 and 18, as the write gap WG decreased, the recording magnetic field intensity became weaker, while the gradient of recording magnetic field intensity became steeper. This is presumably due to that the write shield film 13 absorbed a part of a magnetic flux leaking from the main magnetic pole P1, particularly a magnetic flux leaking along the film thickness direction of the main magnetic pole P1, thereby steepening the gradient of magnetic field from the main magnetic pole P1 to the medium.

Referring to FIGS. 17 and 18, the recording magnetic field intensity and its gradient show the tendency of saturation when the film thickness of the write gap WG exceeded 200 nm. In order to assure the magnetic shielding effect of the write shield film 13, therefore, it is desirable to set the film thickness of the write gap WG equal to or less than 200 nm.

When the film thickness of the write gap WG is set equal to or less than 100 nm, particularly preferably equal to or less than 50 nm, the gradient of recording magnetic field intensity becomes extremely steep. In the viewpoint of steeping the gradient of magnetic field intensity, therefore, it is desirable to set the write gap WG equal to or less than 50 nm. It is understood from comparison between FIG. 17 and FIG. 18 that the lower limit of the write gap WG is appropriately set within the range between 50 nm and 0 nm, for instance, around 20 nm. The data shown in FIGS. 17 and 18 heavily depend on the film thickness of the write gap WG. Therefore, almost the same data can be obtained in any of the structures shown in FIGS. 1 to 12.

2. Magnetic Head Device

Figure 19:
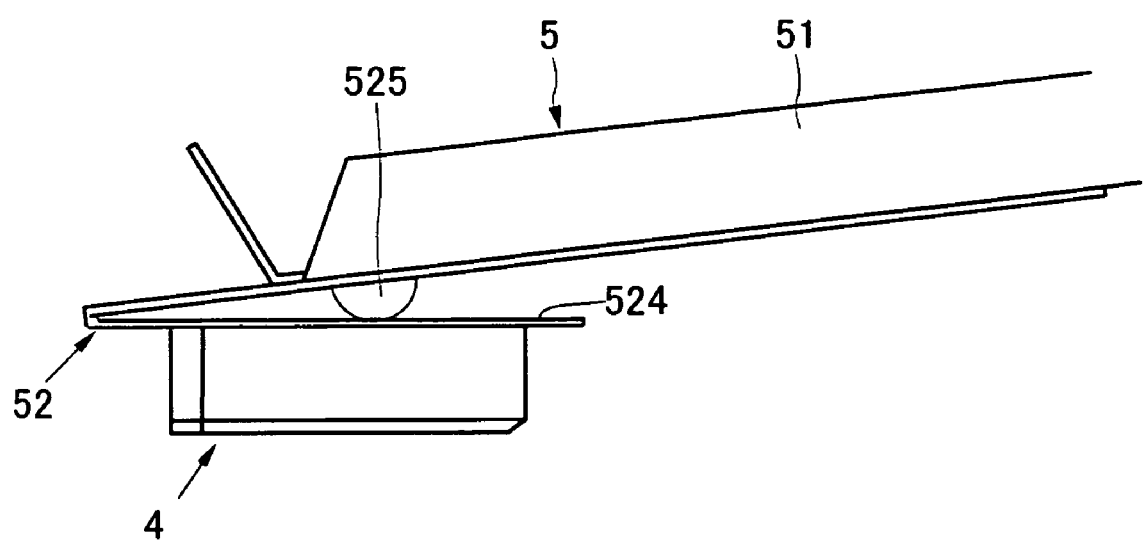
FIG. 19 is a view showing a magnetic head device using a thin film magnetic head according to one embodiment of the present invention.

FIG. 19 is a front view of a magnetic head device according to one embodiment of the present invention. The shown magnetic head device includes one of thin film magnetic heads 4 shown in FIGS. 1 to 12 and a head support device 5. The head support device 5 is constructed such that a flexible member 52, which is constituted of a thin metal sheet, is attached to a free longitudinal end of a support member 51, which is also constituted of a thin metal sheet, and the thin film magnetic head 4 is attached to a lower surface of the flexible member 52.

More specifically, the flexible member 52 includes two outer frame portions extending substantially parallel to a longitudinal axis of the support member 51, a lateral frame which connects the outer frame portions at an end remote from the support member 51, and a tongue piece 524 extending substantially parallel to the outer frame portions from an approximate center of the lateral frame and having a free end at the front. One end of the flexible member 52 on the side opposite from where the lateral frame is located, is attached near the free end of the support member 51 by means of welding, etc.

A load projection 525, which may have a semi-spherical shape, is disposed at the lower surface of the support member 51. A load force is communicated from the free end of the support member 51 to the tongue piece 524 via the load projection 525.

The thin film magnetic head 4 is attached to the lower surface of the tongue piece 524 by means of an adhesive, etc. The thin film magnetic head 4 is supported so that pitching movement and rolling movement is allowed.

In addition to the head support device 5, a wide variety of head support devices, which have been proposed or will be proposed, may be applicable to the present invention. For instance, there may be used a head support device in which the support member 51 and the tongue piece 524 are integrated by using a flexible polymeric wiring board such as a TAB tape. Furthermore, a head support device having a well-known gimbal structure can be used without restraint.

3. Magnetic Recording/Reproducing Apparatus

Figure 20:
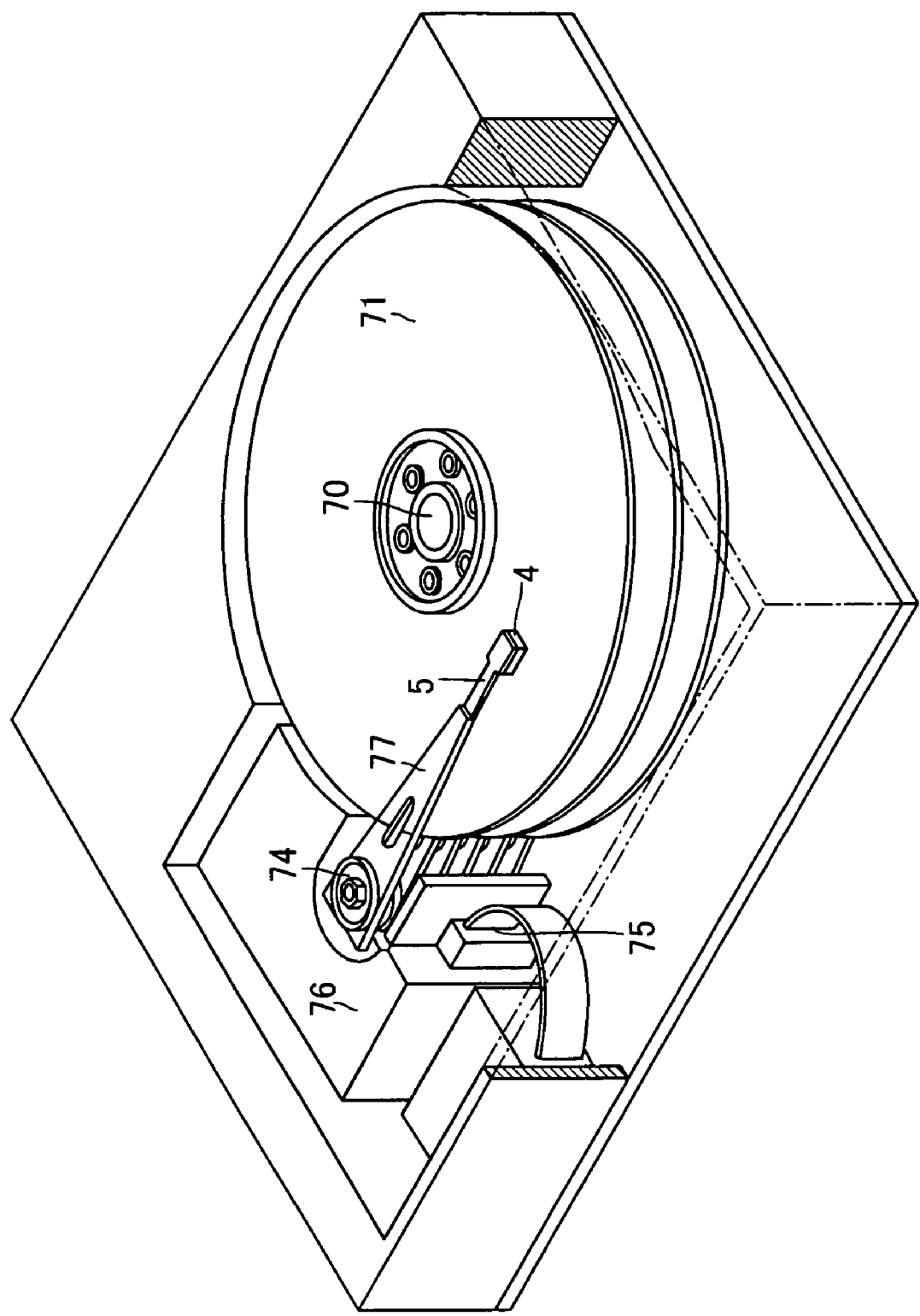
FIG. 20 is a perspective view of a magnetic recording/reproducing apparatus using the magnetic head device shown in FIG. 19.

FIG. 20 is a perspective view of a magnetic recording/reproducing apparatus using the magnetic head device shown in FIG. 19. The shown magnetic recording/reproducing apparatus includes magnetic disks 71 which are rotatable about a shaft 70, thin film magnetic heads 4 which record and reproduce information with respect to the magnetic disks 71, and an assembly carriage device which positions the thin film magnetic heads 4 on the tracks of the magnetic disks 71.

The assembly carriage device is mainly constituted of a carriage 75 which is pivotable about a shaft 74 and an actuator 76 which pivotally drives the carriage 75 and may have a voice coil motor (VCM).

Base portions of a plurality of drive arms 77 stacked along the direction of the shaft 74 are attached to the carriage 75, and the head support device 5 having the thin film magnetic head 4 mounted thereon is secured to the front end of each drive arm 77. Each head support device 5 is disposed at the front end of each drive arm 77 such that the thin film magnetic head 4 located at the front end of the head support device 5 faces the surface of each magnetic disk 71.

The drive arm 77, the head support device 5, and the thin film magnetic head 4 constitute the magnetic head device described with reference to FIG. 19. Accordingly, the magnetic recording/reproducing apparatus shown in FIG. 20 has the effects and advantages described with reference to FIGS. 1 to 19.

While the present invention has been particularly shown and described with respect to preferred embodiments thereof, it will be understood by those skilled in the art that various changes in form and detail may be made therein without departing from the spirit, scope and teaching of the invention.

What is claimed is:

1. A perpendicular magnetic recording element comprising:
   a recording magnetic pole film that includes a yoke portion and a main magnetic pole configured to perform perpendicular recording, wherein said main magnetic pole projects from a front end of said yoke portion to have an end on a medium-facing surface; and
   a continuous magnetic write shield film configured to face the recording magnetic pole film, said write shield film has a height smaller than that of said recording magnetic pole film to have a rear end separated from the recording magnetic pole film and said write shield film has a width that is larger than a height.

2. A perpendicular magnetic recording element comprising:
   a recording magnetic pole film that includes a yoke portion and a main magnetic pole configured to perform perpendicular recording, wherein said main magnetic pole projects from a front end of said yoke portion to have an end on a medium-facing surface; and
   a continuous magnetic write shield film configured to face the recording magnetic pole film, said write shield film has a height smaller than that of said recording magnetic pole film to have a rear end separated from the recording magnetic pole film and said write shield film is spaced apart from said main magnetic pole by a minute distance equal to or less than 200 nm.

3. A thin film magnetic head comprising:
   the perpendicular magnetic recording element of claim 2; and
   a slider supporting said perpendicular magnetic recording element.

4. The thin film magnetic head of claim 3, which further comprises a read element.

5. A magnetic head device comprising:
   the thin film magnetic head according to claim 4; and
   a head support device that supports said thin film magnetic head.

6. A magnetic recording/reproducing apparatus comprising:
   the magnetic head device of claim 4; and
   a magnetic disk that records magnetic record data and reads out magnetic record data by working in conjunction with said magnetic head device.

7. A perpendicular magnetic recording element comprising:
   a recording magnetic pole film that includes a yoke portion and a main magnetic pole configured to perform perpendicular recording, wherein said main magnetic pole projects from a front end of said yoke portion to have an end on a medium-facing surface;
   a continuous magnetic write shield film configured to face the recording magnetic pole film, said write shield film has a height smaller than that of said recording magnetic pole film to have a rear end separated from the recording magnetic pole film;
   a coil film combined with said recording magnetic pole film to generate a recording magnetic field; and
   a magnetic film is disposed at a rear end of said recording magnetic pole film and protrudes from one surface thereof, and the coil film winds around said magnetic film.

* * * * *